(12) United States Patent
Korneluk et al.

(10) Patent No.: US 10,477,462 B2
(45) Date of Patent: Nov. 12, 2019

(54) METHOD AND MOBILE TRANSCEIVER HAVING ADVANCED NETWORK SELECTION

(71) Applicant: BlackBerry Limited, Waterloo (CA)

(72) Inventors: Jose Eduardo Korneluk, Lake Worth, FL (US); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 81 days.

(21) Appl. No.: 15/230,912

(22) Filed: Aug. 8, 2016

(65) Prior Publication Data
US 2018/0041944 A1 Feb. 8, 2018

(51) Int. Cl.
| | |
|---|---|
| *H04W 48/16* | (2009.01) |
| *H04W 4/029* | (2018.01) |
| *H04W 4/02* | (2018.01) |
| *H04W 48/18* | (2009.01) |
| *H04W 52/02* | (2009.01) |
| *H04W 64/00* | (2009.01) |

(Continued)

(52) U.S. Cl.
CPC ........... *H04W 48/16* (2013.01); *G01S 5/0027* (2013.01); *G01S 19/14* (2013.01); *G01S 19/34* (2013.01);
(Continued)

(58) Field of Classification Search
CPC ....... H04W 4/02; H04W 64/00; H04W 48/16; H04W 48/18; H04W 52/0225; G06Q 10/0833; G06F 17/00; G06F 21/88; G01S 5/14; G01S 19/13; G01S 5/0294; G01S 11/02; G01C 21/3415
See application file for complete search history.

(56) References Cited

U.S. PATENT DOCUMENTS 7,212,829 B1 * 5/2007 Lau .......................... 340/539.13
7,509,125 B2   3/2009 Vuong
(Continued)

FOREIGN PATENT DOCUMENTS

| EP | 3009861 A1 | 4/2016 |
|---|---|---|
| EP | 3190836 A1 | 7/2017 |
| WO | WO2011022412 A1 | 2/2011 |

OTHER PUBLICATIONS

Notification of transmittal of the international search report and written opinion; PCT/US2017/-45540; dated Nov. 15, 2017.
(Continued)

*Primary Examiner* — Margaret G Mastrodonato
(74) *Attorney, Agent, or Firm* — Ridout and Maybee LLP

(57) ABSTRACT

A method and mobile transceiver having advanced network selection are provided. In accordance with one embodiment, there is provided a method of operating a mobile transceiver, comprising: waking up a processor and a satellite receiver from a low power mode in response to a wakeup event; determining a location of the mobile transceiver using the satellite receiver; determining whether the determined location corresponds to a waypoint in a travel itinerary, wherein the travel itinerary defines a number of waypoints including an origin endpoint and a destination endpoint; when the determined location corresponds to a waypoint in the travel itinerary, activating a predetermined wireless transceiver from a plurality of wireless transceivers, searching for wireless service using the predetermined wireless transceiver, and sending an asset tracking log to an asset tracking service when wireless service is available.

20 Claims, 7 Drawing Sheets

(51) Int. Cl.
  *G01S 19/14* (2010.01)
  *G01S 19/34* (2010.01)
  *G01S 5/00* (2006.01)
(52) U.S. Cl.
  CPC .............. *H04W 4/02* (2013.01); *H04W 4/029* (2018.02); *H04W 48/18* (2013.01); *H04W 52/0225* (2013.01); *H04W 64/00* (2013.01); *Y02D 70/00* (2018.01); *Y02D 70/10* (2018.01); *Y02D 70/1224* (2018.01); *Y02D 70/1242* (2018.01); *Y02D 70/1244* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/162* (2018.01); *Y02D 70/164* (2018.01); *Y02D 70/166* (2018.01)

(56) References Cited

U.S. PATENT DOCUMENTS

| | | | |
|---|---|---|---|
| 8,401,548 | B2 | 3/2013 | Vuong |
| 2002/0177476 | A1 | 11/2002 | Chou |
| 2009/0061932 | A1* | 3/2009 | Nagarajan ......... H04M 1/72519 455/558 |
| 2010/0157864 | A1 | 6/2010 | Salomone |
| 2011/0090041 | A1* | 4/2011 | Naden ................... G01S 5/0027 340/3.1 |
| 2014/0089384 | A1 | 3/2014 | Diaz |
| 2014/0274009 | A1* | 9/2014 | Do .......................... H04W 8/18 455/418 |
| 2016/0152250 | A1* | 6/2016 | Franchitti ........... B60B 27/0068 701/19 |

OTHER PUBLICATIONS

Wikipedia; "Geo-fence"; https://en.wikipedia.org/wiki/Geo-fence; 3 pages; retrieved Mar. 20, 2018.
Wikipedia; "Waypoint"; https://en.wikipedia.org/wiki/Waypoint; 5 pages; retrieved Mar. 20, 2018.
International Preliminary Report on Patentability; PCT/US2017/045540; dated Feb. 21, 2019.

* cited by examiner

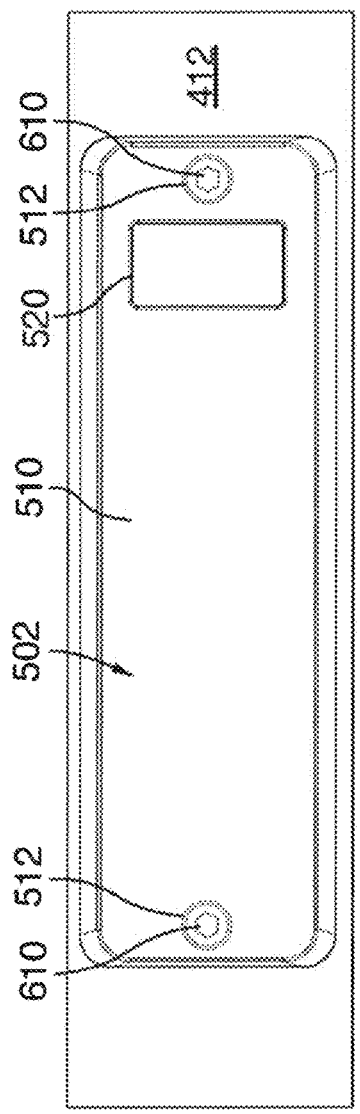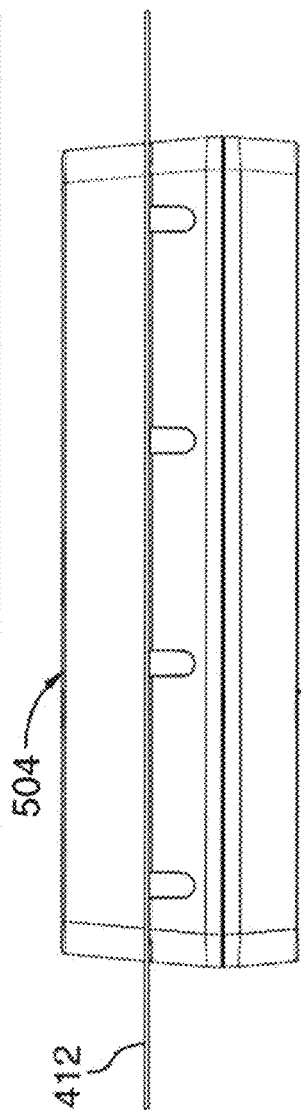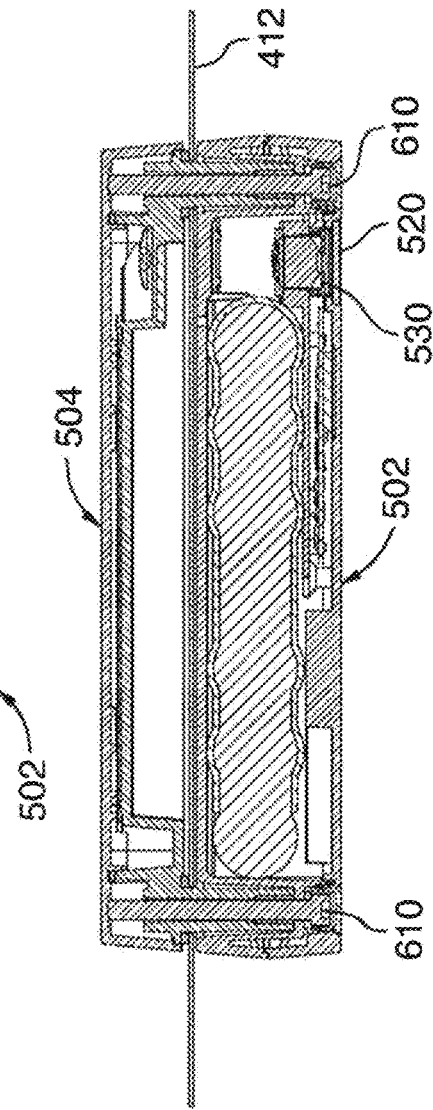

METHOD AND MOBILE TRANSCEIVER HAVING ADVANCED NETWORK SELECTION

TECHNICAL FIELD

The present disclosure relates generally to mobile transceivers, and more specifically, to a method and mobile transceiver having advanced network selection.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device.

GNSS tracking devices may have limited power and/or limited processing resources. Accordingly, methods of efficiently operating and deploying GNSS tracking devices may be desirable.

BRIEF DESCRIPTION OF THE DRAWINGS

FIG. 6A is a front view of the mobile transceiver housing of FIG. 5 mounted to a door of the shipping container of FIG. 4 viewed from the interior of the shipping container.

FIG. 6B is a side view of the mobile transceiver housing of FIG. 5 mounted to a door of the shipping container of FIG. 4.

FIG. 6C is a sectional view of the mobile transceiver housing of FIG. 5 mounted to a door of the shipping container of FIG. 4.

DESCRIPTION OF EXAMPLE EMBODIMENTS

Figure 1:
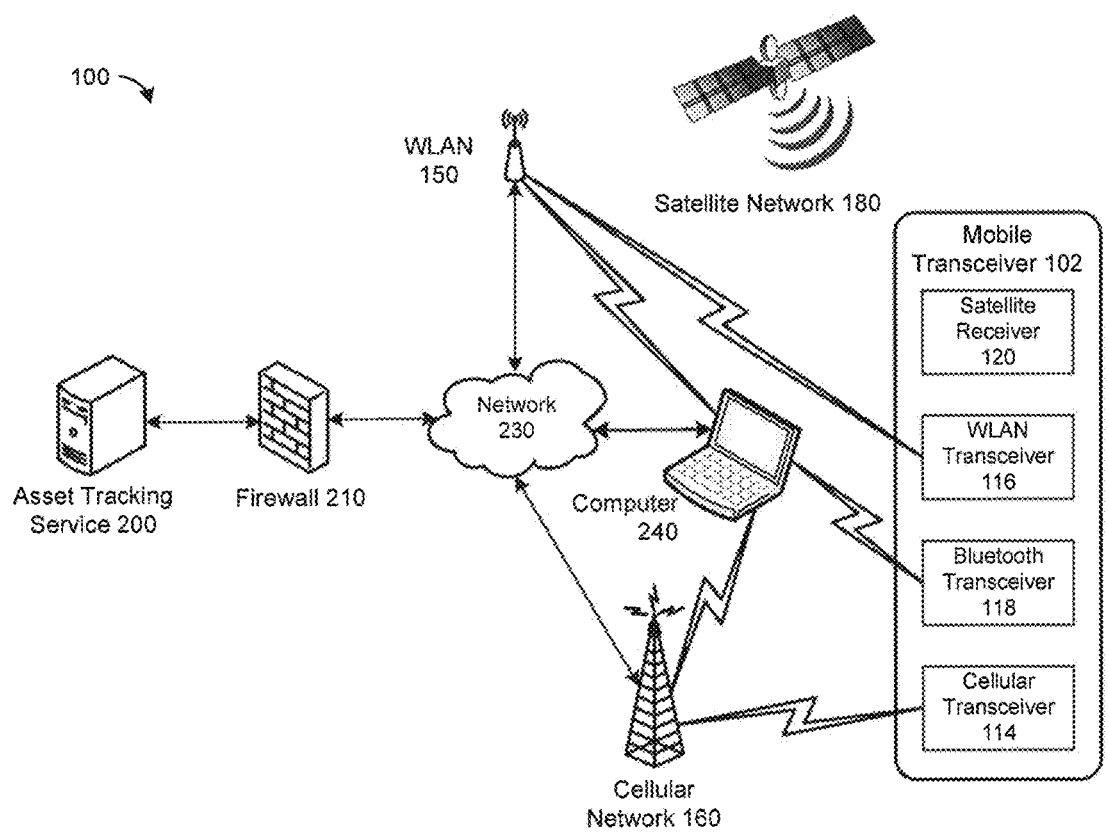
FIG. 1 is a block diagram illustrating a communication system suitable for operating a mobile transceiver in accordance with the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America.

The mobile transceiver of the present disclosure includes multiple wireless transceivers which allow the mobile transceiver to communicate using one of a number of wireless services, such as 4G LTE, 3G, 2G, WLAN/Wi-Fi and/or Bluetooth, etc. to account for the various wireless services that may be available at any time while in transit.

Methods of operating the mobile transceiver (e.g., tracking device) for global and long-range tracking are also provided. The methods are believed to be power efficient and that extends the expected life of the battery of the mobile transceiver. When the mobile transceiver wakes up after a period of inactivity, the wireless service that was last used may no longer be available. Additionally, if crossing continental boundaries and international borders, the wireless access technology and RF bands typically do not overlap. The present disclosure provides methods of operating a mobile transceiver which, among other things, select a wireless transceiver for communicating with an asset tracking service using minimal power, thereby extending the expected life of the battery of the mobile transceiver.

In accordance with an example embodiment of one aspect of the present disclosure, there is provided a method of operating a mobile transceiver, comprising: waking up a processor and a satellite receiver from a low power mode in response to a wakeup event; determining a location of the mobile transceiver using the satellite receiver; determining whether the determined location corresponds to a waypoint in a travel itinerary, wherein the travel itinerary defines a number of waypoints including an origin endpoint and a destination endpoint; when the determined location corresponds to a waypoint in the travel itinerary, activating a predetermined wireless transceiver from a plurality of wireless transceivers, searching for wireless service using the predetermined wireless transceiver, and sending an asset tracking log to an asset tracking service when wireless service is available.

In accordance with another aspect of the present disclosure, there is provided a mobile transceiver comprising a processor, a memory, a wireless transceiver, and a radiation detector, the memory having tangibly stored thereon executable instructions that, when executed by the processor of the mobile transceiver, cause the mobile transceiver to perform the methods described herein.

In accordance with a further aspect of the present disclosure, there is provided a non-transitory machine readable medium having tangibly stored thereon executable instructions that, when executed by a processor of a mobile transceiver, cause the mobile transceiver to perform the methods described herein.

Figure 2:
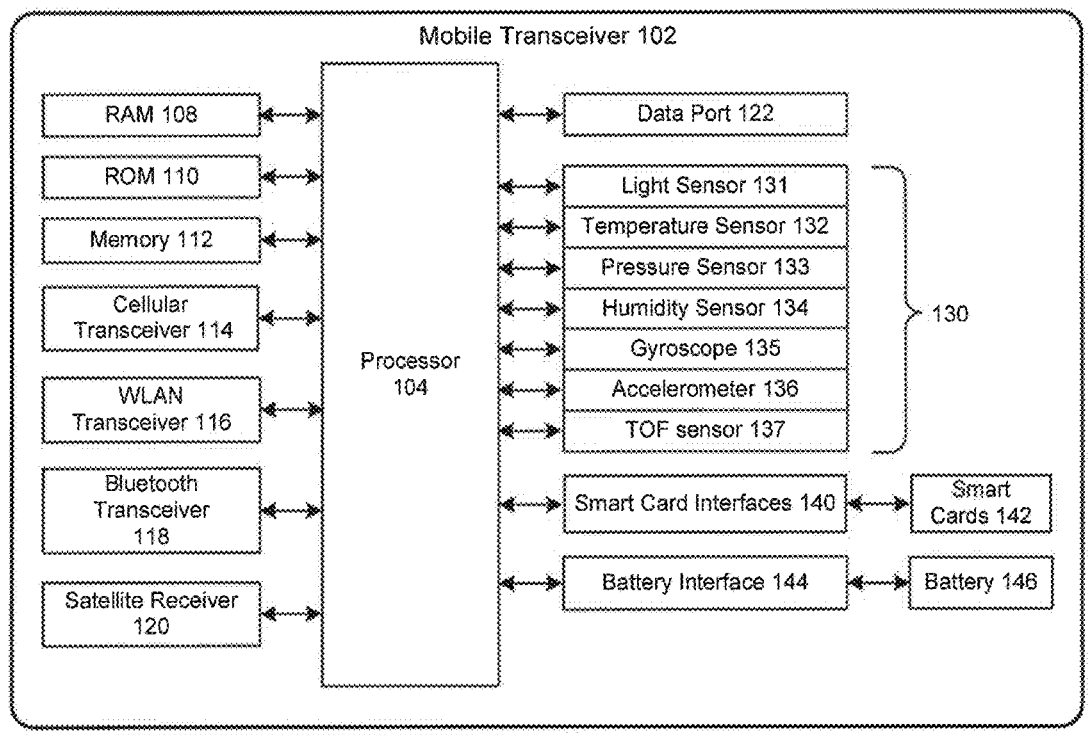
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, a time-of-flight (ToF) sensor 137 and possibly other sensors such as a door contact switch (not shown).

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 uses signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed.

The cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. Multiple dedicated transceivers could be provided to support different wireless services, such as 4G LTE, 3G and 2G wireless services in other embodiments.

Examples of technologies that can be used by the cellular transceiver 114 include LTE, LTE Advanced, General Packet Radio Service (GPRS), Mobitex™, and Data TAC™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. The mobile transceiver 102 includes a plurality of smart card interfaces 140, each smart card interface 140 receiving a smart card 142 for storing and reading data, such as subscriber identity data, by the processor 104. The smart cards 142 may be Subscriber Identity Module (SIM) cards for use in a GSM network or other type of smart card for use in the relevant wireless network type which provides wireless network access. The smart cards 142 may be Universal Integrated Circuit Cards (UICCs) each containing at least a SIM and a Universal Subscriber Identity Module (USIM) application. UICC is the smart card technology used in most contemporary GSM and UMTS networks. While SIM cards for a GSM network has been described as an example, the term smart card is intended to encompass all types of smart cards and other similar technology for providing a USIM, Removable User Identity Module (R-UIM) or CDMA Subscriber Identity Module (CSIM) or other similar technology used in UMTS and CDMA networks. The SIMs may be physical or virtual SIMs. A virtual SIM/SIM card is a data object stored in memory, such as the memory 112, which includes the subscriber identity data normally stored on a physical SIM card, emulating a physical SIM card.

The SIM cards include subscriber identity data (also referred to as SIM data) includes information necessary to obtain access to a wireless voice and/or data network provided, for example, by a wireless network service provider, depending on the embodiment. The subscriber identity data may include network operator bundle information and/or user data information. Examples of network operator bundle information and/or user data information may include subscriber identification information, network selection parameters, network operator data and application data for accessing various data services, etc. In one embodiment, the subscriber identity data comprises subscriber identification information, network selection parameters, and network operator data (sometimes referred to as "network credentials"). In other embodiments, the subscriber identity may include more or less information. For example, in some embodiments, the subscriber identity data may further comprise application data.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service. It will be appreciated that the mobile transceiver 102 is intended for uninterrupted operation even though one or more components, such as the cellular transceiver 114, satellite receiver 120 and/or sensors 130 may be put into a low power mode periodically to conserve battery life. An initialization date or similar date when the mobile transceiver 102 was first powered on, e.g. when the battery 146 is first installed, may be used to determine the date and time of the first power up. Due to the desire for uninterrupted operation, it is contemplated that the mobile transceiver 102 may lack a power button (on/off button) in some embodiments.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking server 200 may be implemented as one or more server modules and is typically located behind a firewall 210. The asset tracking server 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking server 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location in response to an alarm. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., performs measurements of location and sensors) which are then logged and/or reported to the asset tracking service 200. The alarm may be a time-based alarm which the subsystem wakes up at regular intervals in accordance with a predefined schedule among other possibilities. The frequency or schedule at which the location is determined may be fixed or configurable. The mobile transceiver 102 stores the determined location, typically in terms of latitude and longitude, and a time at which the location was determined in a data log stored in the memory 112 of the mobile transceiver 102, also known as an asset tracking log. The values for latitude and longitude may be specified in one of a number of different formats including degrees minutes seconds (DMS), degrees decimal minutes (DDM), or decimal degrees (DD).

As noted above, the mobile transceiver 102 may also use one or more of the sensors 130 to sense or measure an environment of the mobile transceiver 102 in response to an alarm. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log), which is stored in the memory 112. As with the location data, the mobile transceiver 102 may collect sensor data at regular intervals, in accordance with a predefined schedule, or in response to an alarm. The frequency or schedule at which sensor data is obtained may be fixed or configurable.

The mobile transceiver 102 attempts to connect to the asset tracking service 200 to report location and/or sensor data stored in the asset tracking log at regular intervals, in accordance with a predefined schedule, or in response to an alarm. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and do not coincide, although the cycles may overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
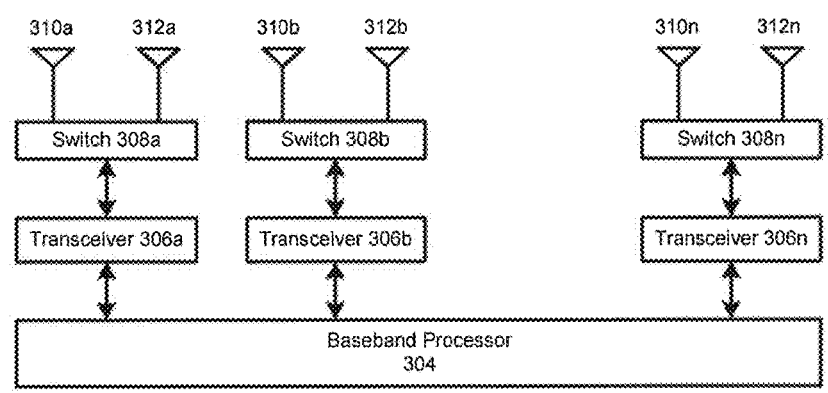
FIG. 3 is a block diagram illustrating a wireless communication subsystem in accordance with an example embodiment of the present disclosure.
Figure 4:
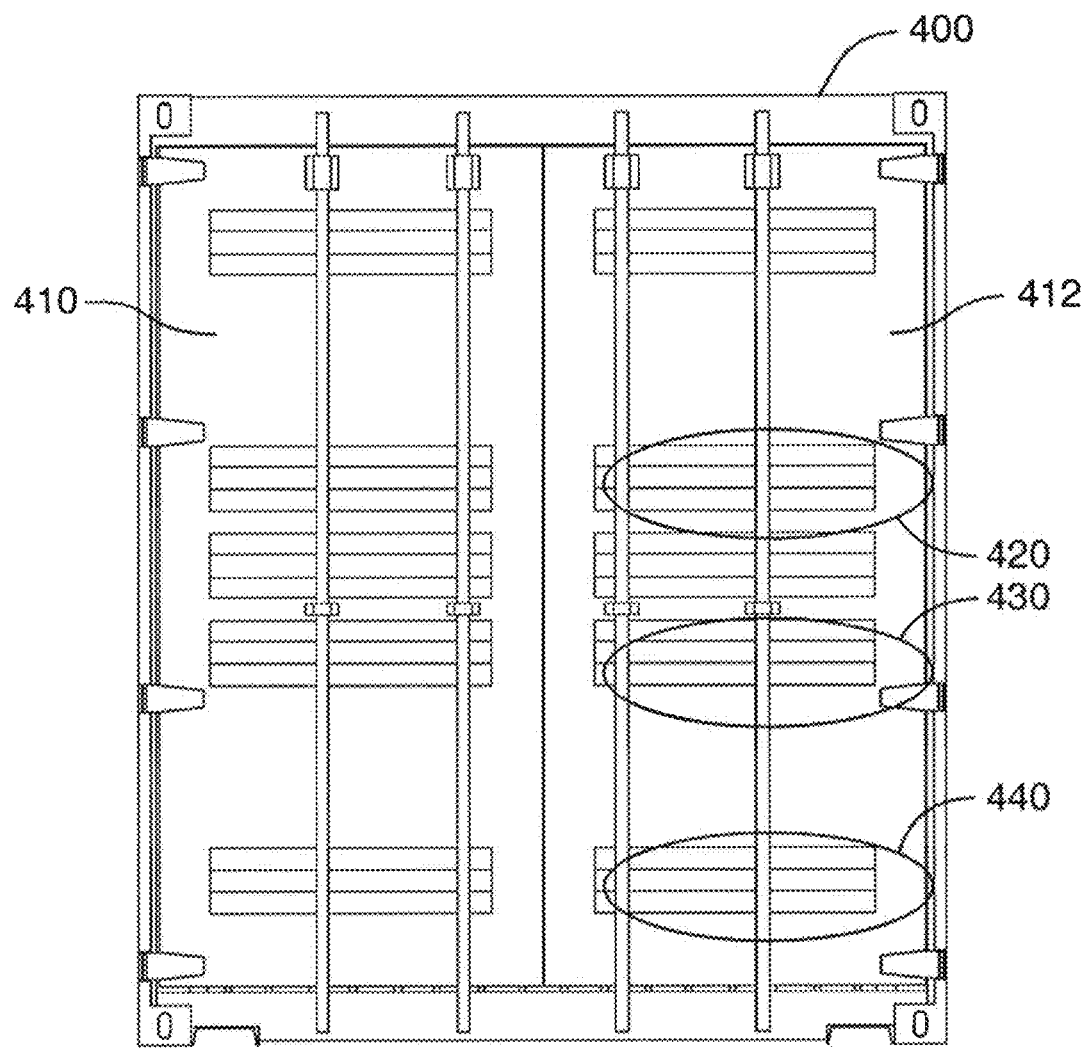
FIG. 4 is an example shipping container suitable for mounting a mobile transceiver in accordance with the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

In at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

The mobile transceiver 102 is intended to be attached to, or incorporated in, a moveable asset to track its location using a satellite receiver 120 as well as sensing or measuring other conditions, such as temperature, humidity, general operating conditions, average speed, maximum speed, content status, door open or closed condition, etc. using the sensors 130. The asset tracked by the mobile transceiver 102 may be a shipping container, truck, rail car, automobile, etc. Tracking requirements for tracking assets may vary depending on the mode of transportation (e.g., ship, rail, car, and possibly air). For example, if the mobile transceiver 102 is attached to an asset that is being moved by rail, the logging and/or reporting may be at longer intervals than if the asset was being moved by truck through town streets. Also, different sensors 130 may be monitored depending on the mode of transportation. For example, there may be no need to check for door open or close status while mobile transceiver 102 is being moved by ship.

The mobile transceiver 102 has a device configuration which defines alarms (e.g., wakeup or trigger events) which wake up the mobile transceiver 102 from an inactive mode (e.g., sleep mode) to determine the device status, including location and/or environmental conditions at a particular time, and report the device status to the asset tracking service 200. The alarms may be scheduled events, for example based on a time of day or frequency, or unscheduled events which asynchronously wake up the mobile transceiver 102 to report the device status.

The mobile transceiver 102 is in a sleep mode much of the time to conserve power and wakes up in response to alarms. For example, the mobile transceiver 102 may wake up only at predetermined time intervals or due to detections or measurements by the sensors 130. When the mobile transceiver 102 wakes up from sleep mode, the mobile transceiver 102 typically determines its location using the satellite receiver 120 and/or measures one or more environmental conditions using one or more of the sensors 130, stores the measured data in a data log in memory 112, and then reports the device status to the asset tracking service 200, for example, by sending at least a portion of a data log to the asset tracking service 200 over the Internet via the cellular transceiver 114. For example, the mobile transceiver 102 may wake up every hour to determine and report the device status, or the mobile transceiver 102 may wake up when a door of the shipping container to which it is attached is opened. When the mobile transceiver 102 wakes up, the mobile transceiver 102 may determine the reason for the alarm. The mobile transceiver 102 may then determine its location using the satellite receiver 120 and/or measure one or more environmental conditions based on the alarm type. The mobile transceiver 102 may then transmit the measured data to the asset tracking service 200. The mobile transceiver 102 then goes back to into the sleep mode until it wakes up in response to another alarm.

Each alarm is defined by a number of parameters that includes an identifier (ID) such as a unique number to identify the alarm, an alarm type that identifies a type of the alarm, one or more condition parameters to be satisfied for the alarm to be triggered, and one or more actions to take when the alarm is triggered. The alarm types are typically based on either time or sensor data. There are two sub-types of time-based alarms.

The first type of timed based alarm is frequency which specifies a frequency at which data is to be measured, the condition parameters for the alarm checked and reported to the asset tracking service 200. An example value for the frequency alarm is every 15 minutes.

The second type of time based alarm is time (or date) which specifies a time and/or date at which the condition parameters for the alarm are checked. An example value for the frequency alarm is 12:00 PM every day. The sensor-based alarms are defined based on the capabilities of the mobile transceiver 102, i.e. the onboard sensors 130. The sensor-based alarms may include temperature, humidity, pressure, movement detection, location, location within or with respect to a specific geo-fence, door open or closed condition, etc. The alarm types may also be based on other factors such as location or location history.

Figure 5:
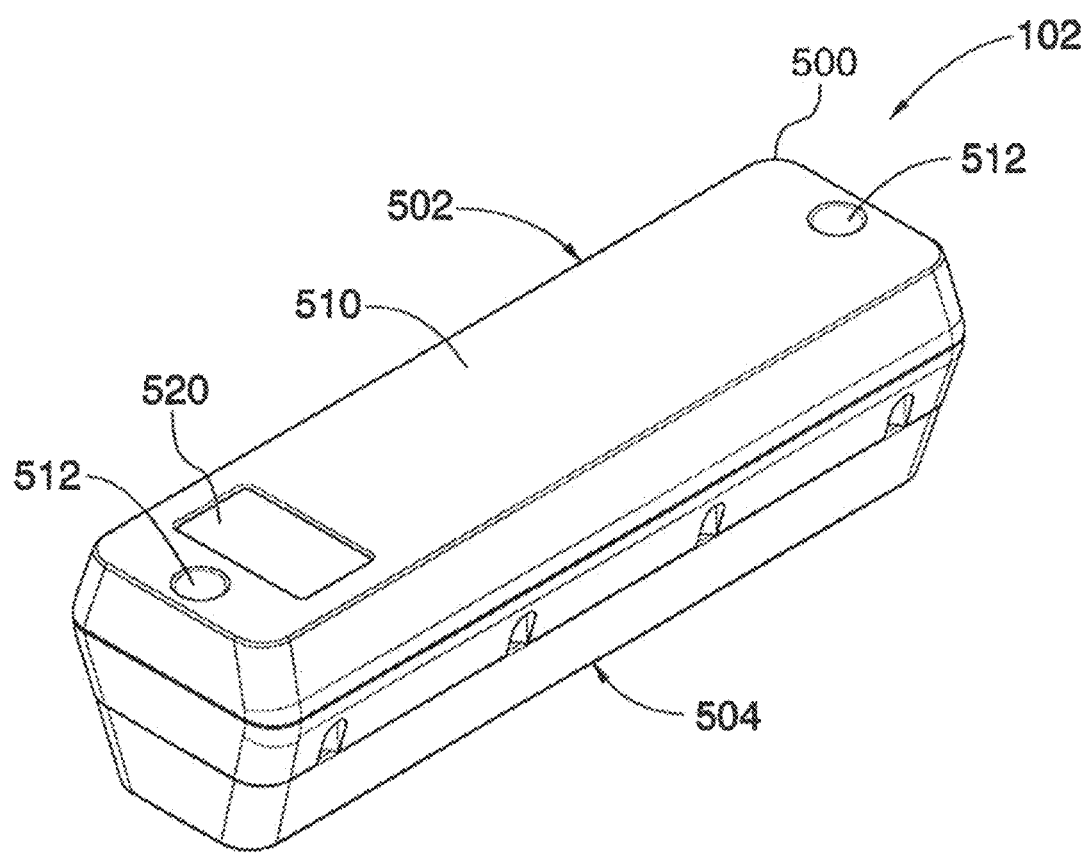
FIG. 5 is a perspective view of a mobile transceiver housing in accordance with one embodiment of the present disclosure.

FIG. 5 illustrates a mobile transceiver housing 500 of the mobile transceiver 102 in accordance with one example embodiment of the present disclosure. The housing 500 is a two-part, interconnected module, configured to be mounted to a shipping container, for example, through a door of the shipping container. The housing 500 comprises an internal module 502 and an external module 504. The internal module 502 is configured to be mounted on the interior of the shipping container, for example, on an inside surface of a door of the shipping container. The external module 504 is configured to be mounted on the exterior of the shipping container, for example, on an outside surface of the door of the shipping container. The external module carries the external antennas 312. The internal module carries the internal antennas 310, and most of the other electronic components of the mobile transceiver 102.

The housing 500 defines a sensor compartment for receiving at least some of the sensors 130 located opposite to the transmissive panel 520. The sensor compartment carries the light sensor 131 and the ToF sensor 137. The sensor compartment may additionally carry the radiation detector 202. Alternatively, the radiation detector 202 may be located in a different location than the sensor compartment. For example, the radiation detector 202 may be separate from the housing 500 to allow for placement of the radiation detector 202 at a suitable location as further described below with reference to FIG. 3C.

The light sensor 131 is configured and positioned within the sensor compartment for sensing light outside of the mobile transceiver 102 through the transmissive panel 520. The ToF sensor 137 is configured and positioned within the sensor compartment for detecting objects in a first direction through the transmissive panel 520 outside of the mobile transceiver 102, e.g. within the interior of the shipping container when the mobile transceiver 102 is mounted to the shipping container. For example, the ToF sensor 137 may be used for detecting objects within the interior of the shipping container by measuring the distance between the mobile transceiver 102 and the nearest object in the first direction, and determining whether the shipper container is loaded (e.g., one or more objects detected) or unloaded (e.g., no objects detected).

FIG. 6A to 6C illustrate the mobile transceiver 102 mounted to the door 412 of the shipping container 400. FIG. 6A is a front view of the mobile transceiver housing 500 mounted to the door 412 of the shipping container 400. FIG. 6B is a side view of the mobile transceiver housing 500 mounted to the door 412 of the shipping container 400. FIG. 6C is a sectional view of the mobile transceiver housing 500 mounted to a door of the shipping container 400. The sensor compartment for receiving the light sensor 131 and ToF sensor 137 is represented by reference 530, and is located opposite to the transmissive panel 520.

Figure 7:
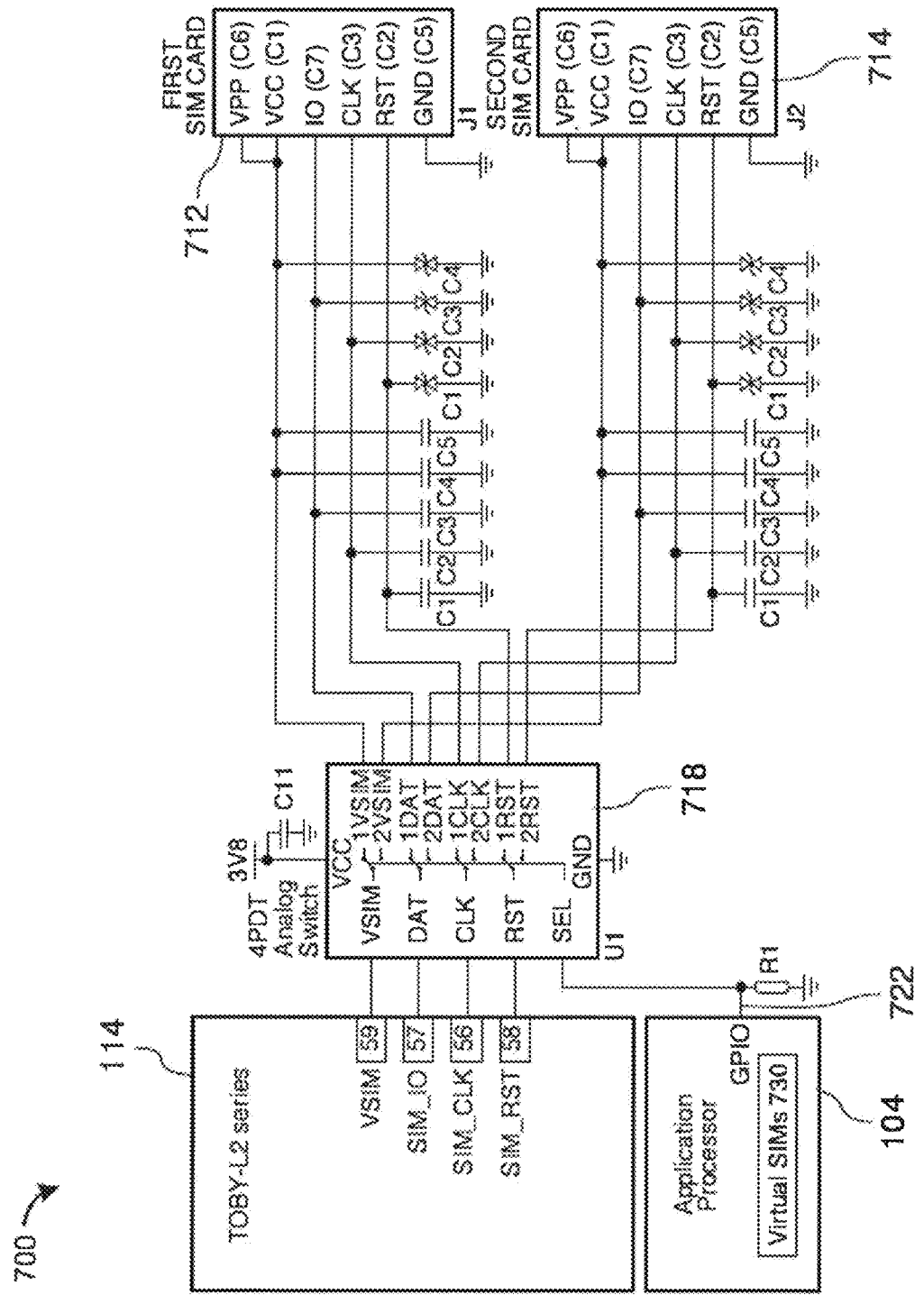
FIG. 7 is a block diagram of a SIM card selection circuit in accordance with one embodiment of the present disclosure.

Reference is now made to FIG. 7, which illustrates a SIM card selection circuit 700 in accordance with one embodiment of the present disclosure. The circuit 700 comprises a physical or virtual SIM cards which are coupled to the cellular transceiver 114 and processor 104 via a switch 718. The SIMs may be physical or virtual SIMs. In the described embodiment, the circuit 700 comprises two SIM cards, represented by references 712 and 714 which are coupled to the cellular transceiver 114 via a 4-port analog switch 718. In other embodiments, more than two SIM cards may be coupled to the cellular transceiver 114. If more than one cellular transceiver 114 is provided, each cellular transceiver 114 may have a physical or virtual SIM cards coupled thereto via a respective switch.

In the described embodiment, the SIM cards 712, 714 share a common cellular transceiver 114 and baseband processor 304 or baseband circuit. Each of SIM cards 712, 714 may be associated with different wireless service provider or providers (also known as "wireless carriers"). The SIM cards 712, 714 may be preferred for particular geographical regions, for example, based on the wireless service providers associated with the SIM cards 712, 714 in those geographical regions. The geographical regions may be differentiated based on country or region (e.g. Asia Pacific, Europe, the Middle East and Africa (EMEA), North America, South America, etc.).

The processor 104 uses the switch 718 to select and switch between the SIM cards 712, 714 used by the cellular transceiver 114. In the described embodiment, the processor 104 is connected to the switch 718 by a GPIO pin 722. In the described embodiment, the switch 718 is a 4-port analog switch including a VSIM port for connecting to a VSIM pin of the cellular transceiver 114 used for SIM supply output, a data (DAT) port for connecting to a SIM_IO port of the cellular transceiver 114 used for SIM data input/output (I/O), a clock (CLK) port for connecting to a SIM_CLK port of the cellular transceiver 114 used for SIM clock output, and a reset (RST) port for connecting to a SIM_RST port of the cellular transceiver 114 used for SIM reset output which resets the cellular transceiver 114. While a hardware switch is used in the described embodiment, a software switch could be used instead of a hardware switch in other embodiments. The software switch could be implemented by software executed by the processor 104.

While physical SIM cards are used in the described embodiment, virtual SIM cards 730 may be provided in other embodiments rather than physical SIM cards. When virtual SIM cards 730 are provided, the switching may be done via software by the transceiver module or processor 104.

Example Methods of Advanced Network Selection

Figure 8:
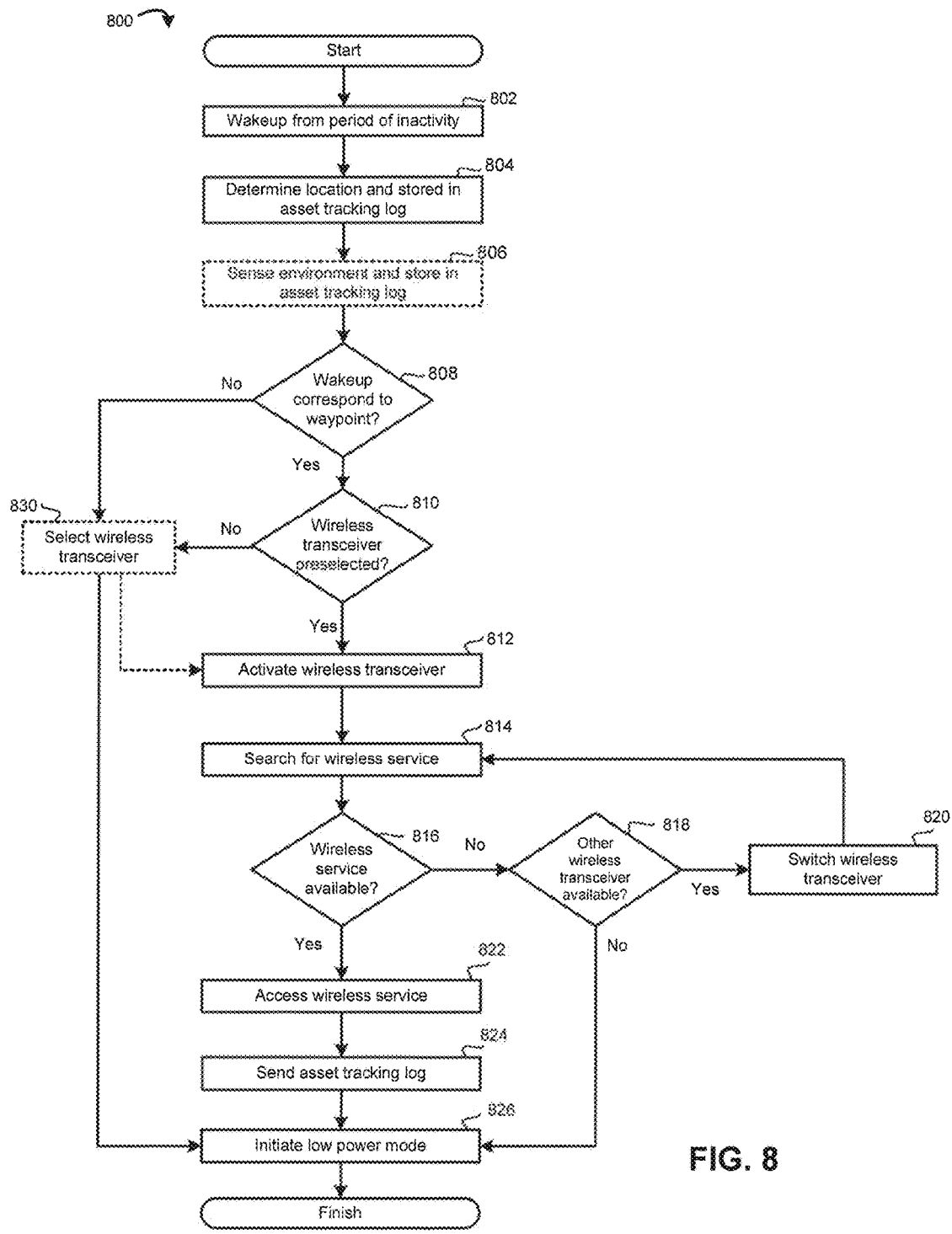
FIG. 8 is a flowchart illustrating a method of operating a mobile transceiver in accordance with embodiments of the present disclosure.

FIG. 8 illustrates a flowchart of a method 800 of operating a mobile transceiver of a mobile transceiver 102 such as a GNSS tracking device in accordance with one example embodiment of the present disclosure. The method may be carried out by software executed by a processor of the mobile transceiver 102. Coding of software for carrying out such a method 800 is within the scope of a person of ordinary skill in the art provided the present disclosure. The method 800 may contain additional or fewer processes than shown and/or described, and may be performed in a different order in other embodiments. Machine readable code executable by the processor to perform the method 800 may be stored in a machine readable medium such as a memory of the mobile transceiver 102.

At 802, the processor 104 of the mobile transceiver 102 wakes up (or activates) from a low power mode, such as a sleep mode, after a period of inactivity in response to a wakeup event (also described herein as an alarm). The wakeup event that caused the wake up may be a time-based wakeup event or sensor-based wakeup event. The mobile transceiver 102 then wakes up (activates) the satellite receiver 120 from a low power mode. For example, the mobile transceiver 102 may wake up the satellite receiver 120 from a sleep mode. The activating of the satellite receiver 120 may be performed by the main processor 104 or the baseband processor 304, depending on the embodiment.

At 804, the mobile transceiver 102 determines its location using the satellite receiver 120 and stores the determined location and a time associated with the determined location in the asset tracking log stored in the memory 112.

At 806, the mobile transceiver 102 optionally senses, via one or more sensors 130, an environment of the mobile transceiver 120. The sensor data acquired via the one or more sensors and a time at which the sensor data was acquired is stored in the asset tracking log in the memory of the mobile transceiver 102. As a preliminary step, the sensors 130 may be awaken (activated) from a low power mode. The operation 806 is optional in that the mobile transceiver 102 only acquires sensor data when specified by the wakeup event.

At 808, the processor 104 of the mobile transceiver 102 determines whether the wakeup event corresponds to a waypoint in a travel itinerary. Alternatively, in other embodiments all wakeup events may be associated with a waypoint in a travel itinerary, in which case operation 808 may be omitted. The travel itinerary defines a number of waypoints (e.g., locations) including an origin, destination and typically a number of intermediate waypoints along an intended route. Each waypoint corresponds to a location or geographical area along the intended route. The travel itinerary specifies a GNSS coordinate or range of GNSS coordinates (e.g., GPS coordinates) for each waypoint in the travel itinerary. The travel itinerary may also define an expected time of arrival (ETA) or time period for each waypoint in the travel itinerary based on the mode of transportation (e.g., rail, ship, boat, truck) in some embodiments.

The processor 104 of the mobile transceiver 102 determines whether the wakeup event corresponds to a waypoint in a travel itinerary by determining whether the determined location matches one of the ranges of GNSS coordinates specified in the travel itinerary. Alternatively, in embodiments in which the travel itinerary may define an ETA or expected time period for each waypoint in the travel itinerary, the processor 104 of the mobile transceiver 102 may determine whether the wakeup event corresponds to a waypoint in a travel itinerary by determining whether the current time and a time zone for the determined location matches one of the ETAs or expected time periods specified in the travel itinerary.

The travel itinerary may be defined by a user or the asset tracking service 200. The travel itinerary may be wirelessly pushed from the asset tracking service 200 to the mobile transceiver 102 at or before the beginning of a trip, for example, as part of a software or firmware update initiated by a system administrator. Alternatively, the travel itinerary may be pre-installed, for example, during device manufacture.

One or more waypoints in the travel itinerary may be set to correspond with a time-based alarm (wakeup event) in some embodiments. The mobile transceiver 102 may be pre-programmed by the asset tracking service 200 at or before the beginning of a trip by sending instructions and/or commands to the mobile transceiver 102 which configure the time-based alarms (wakeup events) which wake up the mobile transceiver 102 from the low power mode. The pre-programmed alarms may be wirelessly pushed from the asset tracking service 200 to the mobile transceiver 102 at or before the beginning of a trip, for example, as part of a software or firmware update initiated by a system administrator.

The travel itinerary also specifies a preselected (or predetermined) wireless transceiver for at least some of the waypoints in the travel itinerary. The preselected wireless transceivers are selected by the asset tracking service 200 based on the wireless network availability at the various waypoints. The selection of the wireless transceiver may be based on a cellular tower signal strength database comprising a set of records correlating cellular tower signal strength (e.g., received signal strength indicator (RSSI)) with GNSS coordinates (e.g., GPS coordinates).

Alternatively, wireless transceivers may be preselected based on preferred carriers, for example, frequencies used by the carrier of the user's home network and/or carriers that have an advantageous partnering agreement with the carrier of the user's home network in addition to, or instead of the wireless network availability. Alternatively, a wireless transport (e.g., wireless technology), e.g. LTE, 3G, 2G, etc., may be specified rather than a wireless transceiver. The wireless transceiver may then be determined from the specified wireless transport.

A wireless transceiver may not be preselected by the asset tracking service 200 if there is no wireless (cellular) network availability at the waypoint. This allows the mobile transceiver 102 to conserve resources when there is no wireless network availability by not activating a wireless transceiver.

Alternatively, in other embodiments, when the wakeup event does not correspond to a waypoint in a travel itinerary or when a wireless transceiver has not been preselected, operations proceed to 830 at which the mobile transceiver 102 selects a wireless transceiver. For example, a last used wireless transceiver may be selected. Alternatively, the wireless transceiver may be selected based on power efficiency of the wireless transceiver or other factors.

In a long-range application in which the mobile transceiver 102 may be out of wireless coverage for an extended period of time, the mobile transceiver 102 may be configured to wake up to perform data logging, i.e. to obtain a location fix and/or acquire sensor data (e.g., environmental data) at one or more waypoints along the intended route.

An example travel itinerary is provided below in Table 1.

TABLE 1

Example travel itinerary

| Event | Waypoint | GNSS coordinates | Wireless Transceiver | Region | Technology |
| --- | --- | --- | --- | --- | --- |
| 1 | Origin | GNSS range 1 | Transceiver 1 | Asia Pacific | 2G/3G |
| ... | In transit | | GNSS only | | |
| n − 1 | In transit | GNSS range 2 | Transceiver 2 | EMEA | LTE (3G fallback) |
| n | Destination | GNSS range 3 | Transceiver 3 | North America | LTE |

The example travel itinerary includes a number of wakeup events. Each wakeup event includes a number of parameters including a wakeup event identifier (ID), a waypoint descriptor, a preselected wireless transceiver, a geographical region, and a wireless transceiver technology. Not all parameters may be defined for each wakeup event. Different parameters may be defined in other embodiments. The available wireless coverage for the particular geographic location and/or a preferred wireless carrier, from a list of available carriers associated with each wireless transceiver (if there is more than one wireless carrier available at the waypoint) may also be specified in the travel itinerary.

The waypoint descriptors in the example travel itinerary include "Origin", "In Transit", and "Destination". However, more detailed waypoints and waypoint descriptors may be provided in other embodiments including, for example, one or more of "Rail", "Ship", "Street", "Dock", "Home", "Warehouse", "Distribution Centre", "Outside" or "Inside". Also, while a geographical region distinct from the waypoint descriptor is provided in the example travel itinerary (e.g., Asia Pacific, Europe, the Middle East and Africa (EMEA), North America, South America, etc.), the geographical region may be omitted in other embodiments. Alternatively, the particular geographic location may be defined in terms of a city name or code, or country name or code. The waypoint descriptors are optional and may be omitted in other embodiments.

While the travel itinerary being described includes certain data items and have a certain data structure, the present disclosure is not intended to be limited to the described data structure. Any data structure in which the described data items are provided and associated with each other may be used, whether those data items are stored in a travel itinerary or elsewhere.

When the wakeup event corresponds to a waypoint in the travel itinerary, operations proceed to 810 at which the mobile transceiver 102 determines whether a wireless transceiver has been preselected for the determined waypoint in the travel itinerary. A wireless transceiver may not be preselected for a particular waypoint for a variety of reasons. For example, the waypoint may be in a location for which there is no coverage (e.g., at sea). However, the waypoint may still be of interest for data logging purposes, for example, for acquiring location data via the satellite receiver 120 and/or sensor data via one or more sensors 130 and storing the acquired location data and/or sensor data in a data log in a memory 112 of the mobile transceiver 102.

When a wireless transceiver has been preselected for the determined waypoint in the travel itinerary, operations proceed to 812 at which the mobile transceiver 102 wakes up the preselected wireless transceiver from a low power mode.

When more than one wireless service is available for the selected SIM, the mobile transceiver 102 may select a wireless service from the available wireless services in accordance with a location of the mobile transceiver or a waypoint associated with the wakeup event and a list of preferred wireless services for a plurality of locations or waypoints of a travel itinerary.

At 814, the wireless transceiver searches for wireless services. The wireless transceiver may search for an available wireless signal based on a preferred wireless carrier from a list of available carriers based on the determined waypoint. Alternatively, the wireless transceiver may search for an available wireless signal based on a stored table of supported wireless services, such as a profile efficiency table.

At 816, the mobile transceiver 102 determines whether wireless services are available based on whether any response to the scans are received, for example, from base stations or nodes in a cellular network 160 and/or the measured signal strength (e.g., RSSI).

When a wireless service is available, operations proceed to 822 at which the mobile transceiver 102 accesses, or connects to, a wireless service from the available wireless services.

At 824, the mobile transceiver 102 reports (e.g., sends) the asset tracking log, which includes acquired location and/or sensor data, or a portion thereof to the asset tracking service 200.

When a wireless service is not available, operations proceed to 818 at which the mobile transceiver 102 determines whether any other wireless transceivers are available.

When another wireless transceiver is available, operations proceed to 820 at which the mobile transceiver 102 switches to an alternate wireless transceiver. Switching to an alternate wireless transceiver comprises initiating a low power mode of the current wireless transceiver, selecting and activating (waking up) the alternate wireless transceiver from a low power mode.

Switching the wireless transceivers may also comprise switching SIM cards in embodiments in which different wireless transceivers are associated with different SIM cards, which may be physical or virtual SIM cards. Switching the wireless transceivers may also comprise switching RF front-end circuits which are shared between the SIM cards. Operations then proceed to 814 at which the wireless transceiver searches for wireless services associated with the second SIM card 714.

When another wireless transceiver is not available, operations proceed to 826 at which the mobile transceiver 102 enters a low power mode. Typically, the processor 104, satellite receiver 120, wireless transceiver and possibly the sensors 130 are placed in a low power mode until the next wakeup event (e.g., logging and/or reporting cycle).

In the described embodiment, the wireless transceivers used in the method 800 consist of cellular transceivers 114, such as 4G Long-Term Evolution (LTE), 3G and/or 2G cellular transceivers 114. However, the method may be adapted so that the wireless transceivers used further comprises wireless transceivers other than cellular transceivers 114, such as the Wi-Fi transceiver 116 and/or Bluetooth transceiver 118.

The above-described methods and devices provide power efficient global and long-range tracking that increase the likelihood that wireless service will be accessible at a particular location by providing multiple wireless transceivers and only powering up one or more of the wireless transceivers when a likelihood of accessing wireless services is relatively high. A travel itinerary with defines preselected wireless transceivers for the intended route is provided. The mobile transceiver activates the wireless transceiver for a given waypoint specified by the travel itinerary, thereby avoiding powering up multiple wireless transceivers and searching until a wireless signal is found. This is particularly advantageous when the mobile transceiver has a non-rechargeable battery. Optionally, the mobile transceiver may automatically select an alternate wireless transceiver if the preselected wireless transceiver cannot locate a wireless signal, no wireless transceiver was preselected for the waypoint, or a malfunction of the preselected wireless transceiver is suspected.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver, comprising:
    waking up a processor and a satellite receiver from a low power mode in response to a time-based wakeup event or sensor-based wakeup event;
    determining a location of the mobile transceiver using the satellite receiver;
    determining whether the determined location corresponds to a waypoint in a pre-programmed travel itinerary, the travel itinerary being stored in a memory of the mobile transceiver and defining a number of waypoints along a planned route, each of the waypoints defining a location, the waypoints including an origin endpoint, a destination endpoint and intermediate locations between the origin endpoint and destination endpoint;

in response to a determination that the determined location corresponds to a waypoint in the travel itinerary:
identifying a predetermined wireless transceiver from a plurality of wireless transceivers in accordance with the wake-up event;
activating the predetermined wireless transceiver;
searching for wireless service using the predetermined wireless transceiver; and
sending an asset tracking log to an asset tracking service in response to wireless service being available.

2. The method of claim 1, further comprising:
storing the determined location and a time associated with the determined location in the asset tracking log.

3. The method of claim 1, further comprising:
acquiring sensor data using one or more sensors and storing the acquired sensor data in the asset tracking log.

4. The method of claim 1, further comprising:
initiating a low power mode for the mobile transceiver when the determined location does not correspond to a waypoint in the travel itinerary.

5. The method of claim 1, further comprising:
selecting a wireless transceiver when the determined location does not correspond to a waypoint in the travel itinerary;
activating the selected wireless transceiver; and
sending an asset tracking log to an asset tracking service.

6. The method of claim 1, further comprising:
when the determined location corresponds to a waypoint in the travel itinerary, determining whether a wireless transceiver in the plurality of wireless transceivers has been predetermined for the waypoint.

7. The method of claim 6, further comprising:
initiating a low power mode for the mobile transceiver when a wireless transceiver has not been predetermined for the waypoint.

8. The method of claim 6, further comprising:
selecting a wireless transceiver in the plurality of wireless transceivers when a wireless transceiver has not been predetermined for the waypoint;
activating the selected wireless transceiver; and
sending an asset tracking log to an asset tracking service.

9. The method of claim 1, further comprising:
initiating a low power mode for the mobile transceiver subsequent to sending the asset tracking log to the asset tracking service.

10. The method of claim 1, further comprising:
activating an alternate wireless transceiver when wireless service is not available;
searching for wireless service using the alternate wireless transceiver; and
sending an asset tracking log to an asset tracking service when wireless service is available.

11. The method of claim 10, wherein activating the alternate wireless transceiver when wireless service is not available comprises switching from a first SIM card in a plurality of SIM cards to a different SIM card in the plurality of SIM cards.

12. The method of claim 1, wherein the plurality of wireless transceivers comprise a plurality of cellular transceivers.

13. The method of claim 12, wherein the plurality of wireless transceivers further comprise one or more of a Wi-Fi transceiver or Bluetooth transceiver.

14. The method of claim 1, wherein the travel itinerary specifies a range of Global Navigation Satellite System (GNSS) coordinates for each waypoint in the travel itinerary, wherein determining whether the determined location corresponds to a waypoint in a travel itinerary comprises determining whether the determined location matches one of the ranges of GNSS coordinates specified in the travel itinerary.

15. The method of claim 1, wherein the travel itinerary specifies an expected time of arrival for each waypoint in the travel itinerary, wherein determining whether a current time and a time zone for the determined location matches one of the ETAs specified in the travel itinerary.

16. A mobile transceiver, comprising:
a processor;
a memory coupled to the processor;
a satellite receiver coupled to the processor; and
a plurality of wireless transceivers coupled to the processor;
wherein the memory has tangibly stored thereon executable instructions that, when executed by the processor, cause the mobile transceiver to:
wake up a processor and a satellite receiver from a low power mode in response to a time-based wakeup event or sensor-based wakeup event;
determine a location of the mobile transceiver using the satellite receiver;
determine whether the determined location corresponds to a waypoint in a pre-programmed travel itinerary, the travel itinerary being stored in a memory of the mobile transceiver and defining a number of waypoints along a planned route, each of the waypoints defining a location, the waypoints including an origin endpoint, a destination endpoint and intermediate locations between the origin endpoint and destination endpoint;
in response to a determination that the determined location corresponds to a waypoint in the travel itinerary:
identify a predetermined wireless transceiver from a plurality of wireless transceivers in accordance with the wake-up event;
activate the predetermined wireless transceiver;
search for wireless service using the predetermined wireless transceiver; and
send an asset tracking log to an asset tracking service in response to wireless service being available.

17. The mobile transceiver of claim 16, wherein the travel itinerary specifies a range of Global Navigation Satellite System (GNSS) coordinates for each waypoint in the travel itinerary, wherein determining whether the determined location corresponds to a waypoint in a travel itinerary comprises determining whether the determined location matches one of the ranges of GNSS coordinates specified in the travel itinerary.

18. The mobile transceiver of claim 16, wherein the travel itinerary specifies an expected time of arrival (ETA) for each waypoint in the travel itinerary, wherein determining whether a current time and a time zone for the determined location matches one of the ETAs specified in the travel itinerary.

19. The mobile transceiver of claim 16, wherein the mobile transceiver is a Global Navigation Satellite System (GNSS) tracking device.

20. A non-transitory machine readable medium having tangibly stored thereon executable instructions that, when executed by a processor of a mobile transceiver, the mobile transceiver comprising a processor, a memory, a satellite receiver, and a plurality of wireless transceivers coupled to the processor, cause the mobile transceiver to:
- wake up a processor and a satellite receiver from a low power mode in response to a time based wakeup event or a sensor based wakeup event;
- determine a location of the mobile transceiver using the satellite receiver;
- determine whether the determined location corresponds to a waypoint in a pre-programmed travel itinerary, the travel itinerary being stored in a memory of the mobile transceiver and defining a number of waypoints along a planned route, each of the waypoints defining a location, the waypoints including an origin endpoint, a destination endpoint and intermediate locations between the origin endpoint and destination endpoint;
- in response to a determination that the determined location corresponds to a waypoint in the travel itinerary:
  - identify a predetermined wireless transceiver from a plurality of wireless transceivers in accordance with the wake-up event;
  - activate the predetermined wireless transceiver;
  - search for wireless service using the predetermined wireless transceiver; and
  - send an asset tracking log to an asset tracking service in response to wireless service being available.

* * * * *